(12) United States Patent
Axness et al.

(10) Patent No.: US 7,962,170 B2
(45) Date of Patent: Jun. 14, 2011

(54) MULTI-MODE RADIO WITH INTERFERENCE CANCELLATION CIRCUIT

(75) Inventors: Timothy A Axness, Collegeville, PA (US); Leonid Kazakevich, Plainview, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 167 days.

(21) Appl. No.: 12/255,746

(22) Filed: Oct. 22, 2008

(65) Prior Publication Data

US 2009/0047914 A1 Feb. 19, 2009

Related U.S. Application Data

(63) Continuation of application No. 11/654,766, filed on Jan. 17, 2007, now Pat. No. 7,447,519, which is a continuation of application No. 10/852,640, filed on May 24, 2004, now Pat. No. 7,177,663.

(60) Provisional application No. 60/473,600, filed on May 27, 2003.

(51) Int. Cl.
*H04B 1/44* (2006.01)
(52) U.S. Cl. ............... 455/552.1; 455/553.1; 455/73
(58) Field of Classification Search ............... 455/552.1, 455/73, 82, 87, 553.1, 570, 132, 67.13, 277.1, 455/76–78, 307
See application file for complete search history.

(56) References Cited

U.S. PATENT DOCUMENTS

| | | | |
|---|---|---|---|
| 5,442,663 A | 8/1995 | Andersen et al. | |
| 6,526,110 B1 | 2/2003 | Bao et al. | |
| 6,643,522 B1 | 11/2003 | Young | |
| 6,671,519 B2 * | 12/2003 | Jeon et al. | 455/522 |
| 6,952,594 B2 | 10/2005 | Hendin | |
| 7,324,493 B2 | 1/2008 | Yamada et al. | |
| 2002/0090974 A1 | 7/2002 | Hagn | |
| 2003/0102907 A1 * | 6/2003 | Tasker et al. | 330/2 |
| 2004/0095919 A1 | 5/2004 | Nitani et al. | |
| 2004/0185795 A1 * | 9/2004 | Shamsaifar et al. | 455/83 |
| 2004/0189526 A1 | 9/2004 | Frank | |

FOREIGN PATENT DOCUMENTS

| | | |
|---|---|---|
| EP | 1 303 055 | 4/2003 |
| JP | 04-356824 | 12/1992 |
| JP | 11-125670 | 5/1999 |
| JP | 2002-185356 | 6/2002 |
| JP | 2002-0057263 | 7/2002 |
| JP | 2002-374179 | 12/2002 |

* cited by examiner

*Primary Examiner* — Nay Maung
*Assistant Examiner* — Angelica M Perez
(74) *Attorney, Agent, or Firm* — Volpe and Koenig, P.C.

(57) ABSTRACT

A multi-mode wireless transmit/receive unit (WTRU) includes at least one antenna, first and second communication mode receivers and a first communication mode transmitter. The first and second receivers simultaneously receive signals from the antenna. The first transmitter generates and sends a first type of signal to the antenna while, at the same time, the second receiver receives a second type of signal from the antenna. In a preferred embodiment, the WTRU further includes a vector multiplier configured to reduce or eliminate interference of signals received by the second receiver, the interference being caused by the first transmitter. The vector multiplier adjusts the phase and amplitude of noise (i.e., spurious in-band noise) measured by the second receiver. The WTRU may further include a second communication mode transmitter configured to generate and send a second type of signal to the antenna.

11 Claims, 3 Drawing Sheets

MULTI-MODE RADIO WITH INTERFERENCE CANCELLATION CIRCUIT

CROSS REFERENCE TO RELATED APPLICATION

This application is a continuation of U.S. patent application Ser. No. 11/654,766 filed Jan. 17, 2007, which is a continuation of U.S. patent application Ser. No. 10/852,640 filed May 24, 2004, which issued as U.S. Pat. No. 7,177,663 on Feb. 13, 2007, which claims the benefit of U.S. Provisional Patent Application Ser. No. 60/473,600 filed May 27, 2003, which are incorporated by reference as if fully set forth herein.

FIELD OF THE INVENTION

The present invention relates generally to wireless communication systems. More particularly, the present invention relates to attenuating spurious transmissions which interfere with communications received by a receiver in a wireless communication system.

BACKGROUND

In a conventional cellular communication system including a plurality of wireless transmit/receive units (WTRUs), (i.e., user equipments (UEs), radios, mobile platforms, handsets), and a network, the WTRUs are required to measure signals from different cells in order to find base stations with the strongest signal and report them to the network for facilitating handover (connected mode) and cell reselection (idle mode). When a new base station with a stronger signal than a current serving base station is measured, the network will instruct the respective WTRU to handover to the new base station. These measurements are typically performed on common channels, such as the pilot channel in Code Division Multiple Access (CDMA) networks and the Broadcast Control Channel (BCCH) in Global System for Mobile communications (GSM) networks.

Multi-mode WTRUs support more than one Radio Access Technology (RAT). For example, a multi-mode WTRU may include support for Universal Terrestrial Radio-Frequency Division Duplex (UTRA-FDD) CDMA and GSM. Usually, multi-mode WTRUs are required to support handover between different RATs. Such handovers are referred to as inter-RAT handovers.

A problem arises for the case of multi-mode WTRUs in which one of the modes requires constant transmissions. For example, during an active UTRA-FDD CDMA call, i.e., when in "connected mode", the WTRUs continuously transmit and receive in different frequency bands. In order to make a measurement for an inter-RAT handover, such as to a GSM or Time Division Synchronous Code Division Multiple Access (TD-SCDMA) network, the WTRU must stop transmitting during the measurement period. Otherwise, emissions from the CDMA transmitter will interfere with the receiver belonging to the other RAT.

FIG. 1 illustrates the interference problem described above. A frequency spectrum 100 includes a UTRA-FDD signal in the 1920-1980 MHz band 105 having spurious emissions 110 that fall within the GSM Digital Cellular System (DCS) 1800 receive band 115 from 1805-1880 MHz. The UTRA-FDD signal 105 itself acts as a large out-of-band blocker for the GSM receiver and desensitizes the receiver if not attenuated. Known practical filter solutions provide some attenuation of the UTRA-FDD signal, but the small frequency spacing and cost/size constraints results in inadequate filtering which does not affect the level of the spurious transmission from the UTRA-FDD transmitter.

Networks that require continuous transmissions using multi-mode operation avoid this problem by allowing the WTRU to create gaps in its transmissions. During the gap period, the WTRU stops transmitting to the serving cell. Instead, the WTRU receives signals from neighboring cells belonging to a different system. For example, by implementing a compressed mode in UTRA-FDD, the WTRU is able to take advantage of the gaps in transmissions to make measurements on GSM cells.

FIG. 2 illustrates an example of a conventional WTRU 200 which implements a compressed mode operation. The WTRU 200 includes an antenna 205, a system switch 210, a duplexer 215, a universal mobile telecommunications system (UMTS) receiver (Rx) 220, a UMTS transmitter (Tx) 225, a transmit/receive switch 230, a bandpass filter 235, a GSM Rx 240, and a GSM Tx 245. The system switch 210 is used to selectively connect the antenna 205 to one of a UMTS (e.g., UTRA-FDD) radio or a GSM radio. By implementing the compressed mode, cell capacity is reduced because communications which occur between the WTRU 200 and the network is interrupted during the above-mentioned transmission gaps. A multi-mode radio that simultaneously receives signals from a UTRA-FDD cell and a Time Division Multiple Access (TDMA) cell to avoid such an interruption in communications is desired. Furthermore, a multi-mode radio that allows the GSM Rx 240 to receive signals without interference from the UMTS Tx 225 is also desired.

SUMMARY

A multi-mode WTRU includes at least one antenna, a first communication mode receiver, a second communication mode receiver and a first communication mode transmitter. The antenna is configured to receive and transmit at least two different types of signals. The first communication mode receiver is configured to receive a first type of signal from the antenna. The second communication mode receiver is configured to receive a second type of signal from the antenna. The first communication mode transmitter is configured to generate and send the first type of signal to the antenna. The first and second communication mode receivers simultaneously receive signals from the antenna. The first transmitter sends the first type of signal to the antenna while, at the same time, the second receiver receives the second type of signal from the antenna.

The WTRU may further include a vector multiplier configured to reduce or eliminate interference of signals received by the second communication mode receiver, the interference being caused by the first communication mode transmitter. The vector multiplier adjusts the phase and amplitude of the interference.

The WTRU may further include a second communication mode transmitter configured to generate and send the second type of signal to the antenna, and a switch in communication with the antenna. The switch may be configured to selectively connect the second communication mode transmitter to the antenna, prevent signals from the antenna to reach the first and second communication mode receivers, and prevent the first communication mode transmitter from sending the first type of signal to the antenna.

The first communication mode receiver may be a universal mobile telecommunications system (UMTS) receiver. The second communication mode receiver may be a global system for mobile communications (GSM) receiver. The first type of signal may be a frequency division duplex (FDD) signal. The first type of signal received by the first communication mode receiver may be originated by a universal terrestrial radio access (UTRA)-FDD cell. The second type of signal may be a TDMA-FDD signal. The second type of signal received by the second communication mode receiver may be originated by a universal terrestrial radio access (UTRA)-TDD cell. The second type of signal received by the second communication mode receiver may be originated by a global system for mobile communications (GSM) cell.

BRIEF DESCRIPTION OF THE DRAWINGS

A more detailed understanding of the invention may be had from the following description of a preferred example, given by way of example and to be understood in conjunction with the accompanying drawing wherein.

DETAILED DESCRIPTION OF THE PREFERRED EMBODIMENTS

The following is a description of a preferred embodiment of a WTRU or integrated circuit (IC) used to communicate with a UTRA-FDD cell of a wireless multi-cell FDD communication system while receiving signals from a TDMA cell, such as a GSM or UTRA-TDD cell. When the WTRU is not in a connected mode, the WTRU must periodically search for new base stations. Typically the WTRU must do this as efficiently as possible to minimize power consumption, thus maximizing battery life. This can be performed most efficiently if the WTRU can simultaneously receive signals from an FDD cell and a TDMA cell.

Preferably, the present invention disclosed herein is incorporated into a wireless transmit/receive unit (WTRU). Hereafter, a WTRU includes but is not limited to a user equipment, mobile station, fixed or mobile subscriber unit, pager, or any other type of device capable of operating in a wireless environment. The features of the present invention may be incorporated into an IC or be configured in a circuit comprising a multitude of interconnecting components.

The present invention is applicable to communication systems using TDD, TDMA, FDD, CDMA, CDMA 2000, time division synchronous CDMA (TDSCDMA), and orthogonal frequency division multiplexing (OFDM). However, the present invention is envisaged to be applicable to other types of communication systems as well.

Figure 1:
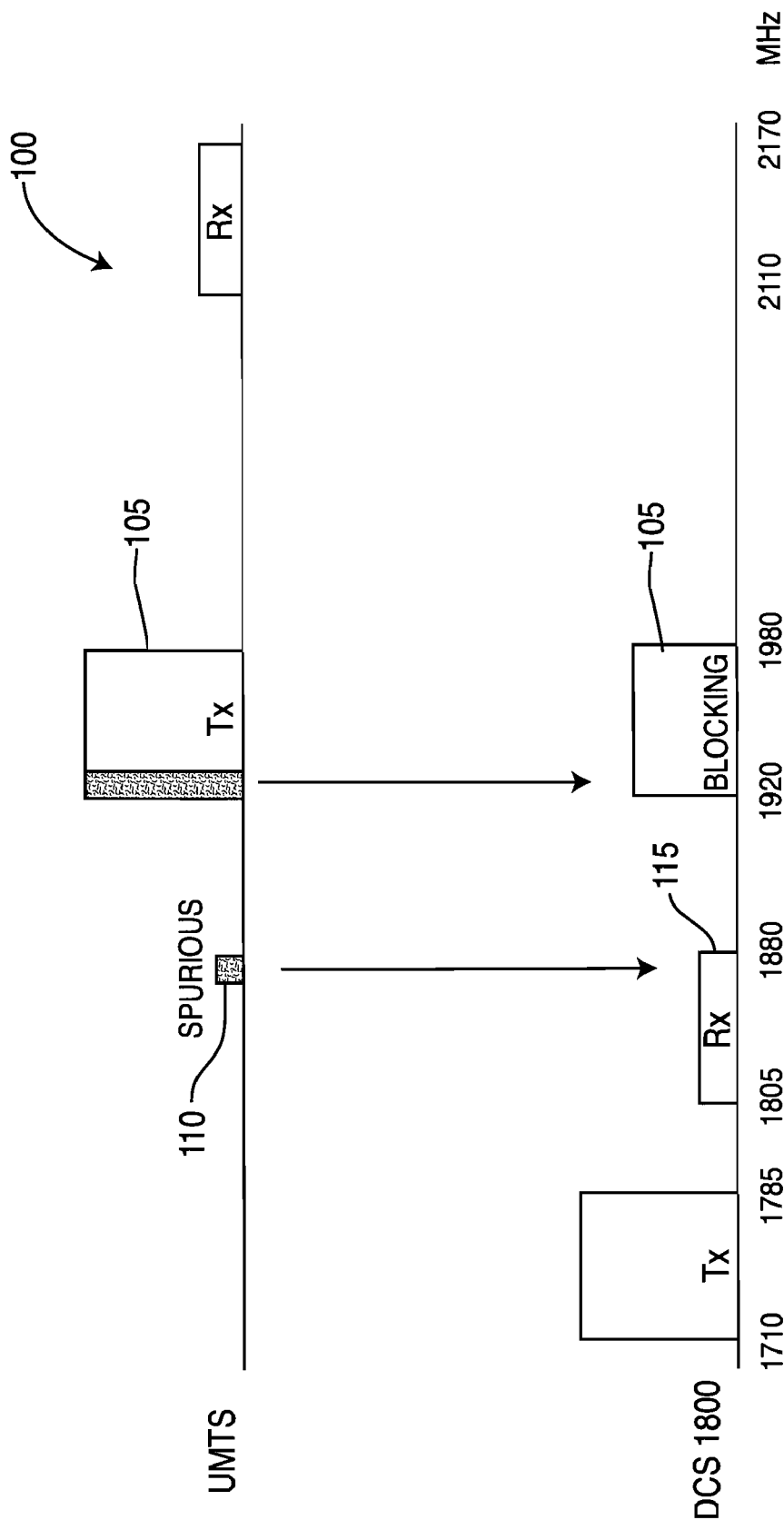
FIG. 1 provides an example of interference in a multi-mode WTRU.
Figure 2:
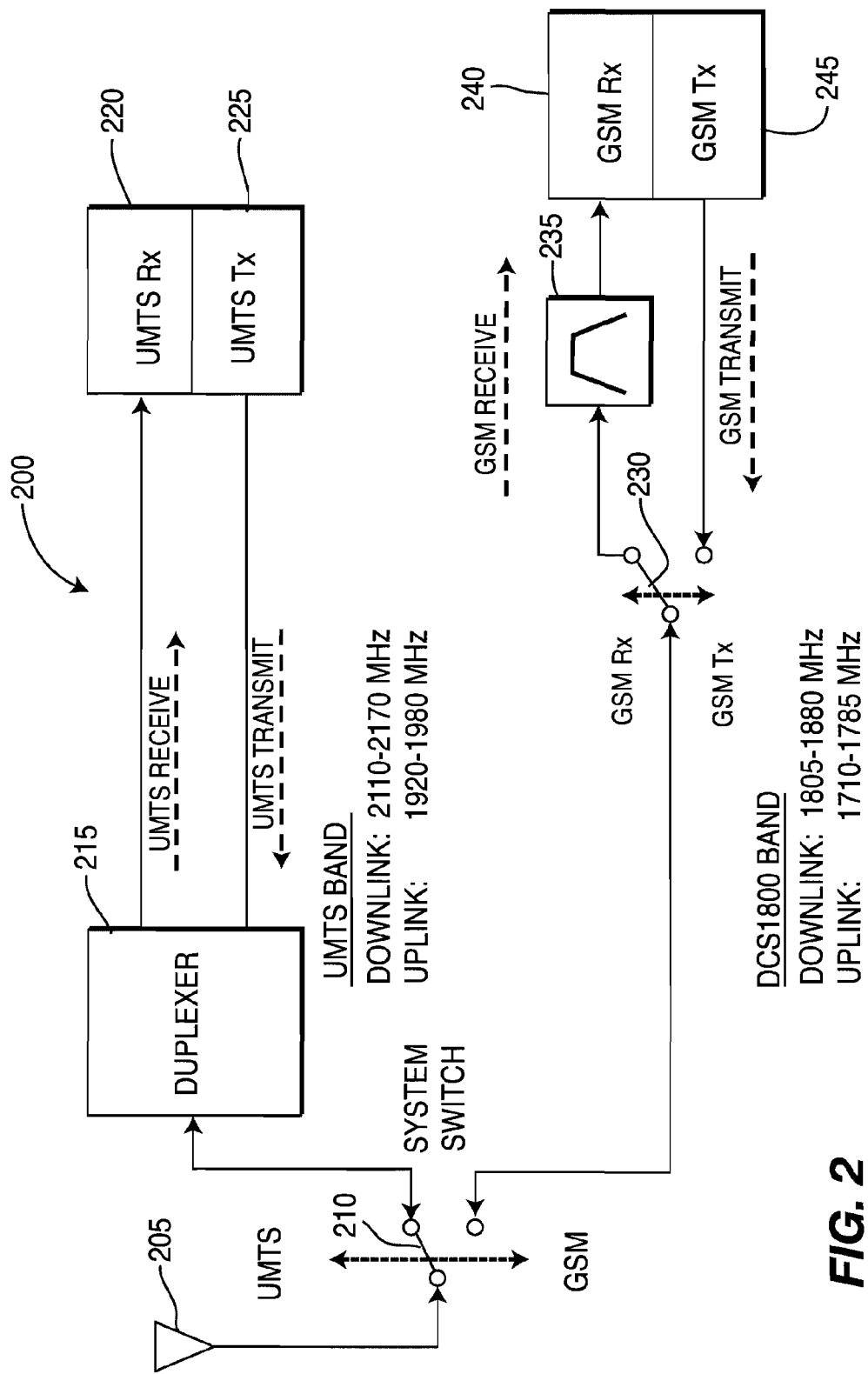
FIG. 2 shows an example of a conventional multi-mode WTRU requiring compressed mode for performing measurements.
Figure 3:
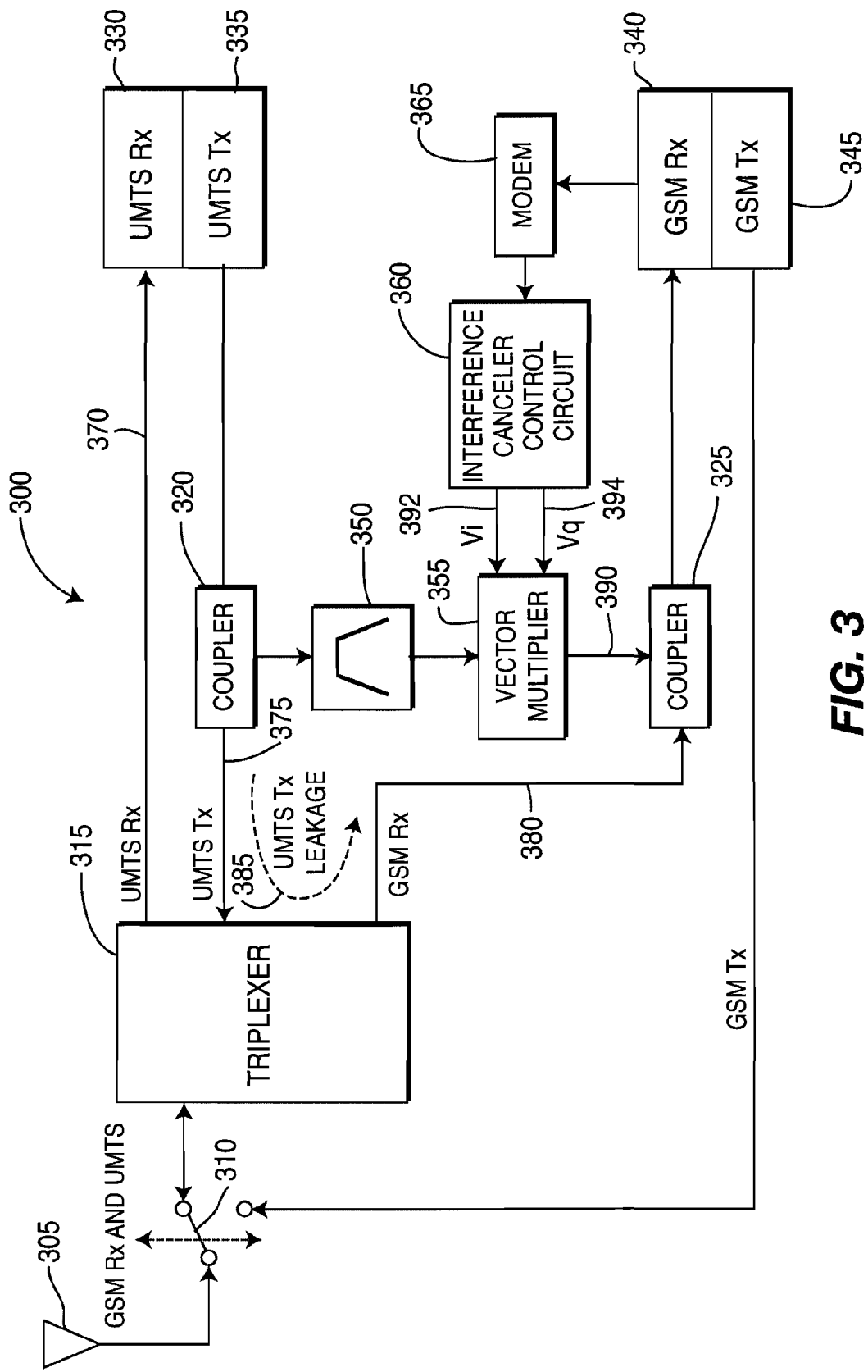
FIG. 3 provides a system block diagram of a WTRU incorporating an interference cancellation circuit in accordance with a preferred embodiment of the present invention.

FIG. 3 is a block diagram showing a preferred embodiment of a interference cancellation system which is incorporated into a WTRU 300. The WTRU includes an antenna 305, a transmit/receive switch 310, a triplexer 315, first coupler 320, second coupler 325, a UMTS Rx 330, a UMTS Tx 335, a GSM Rx 340, a GSM Tx 345, a bandpass filter 350, an in-phase/quadrature (I/Q) vector multiplier 355, a interference canceler control circuit 360 and a modem 365. When the WTRU 300 is in a receive mode, signal arriving at the antenna 305 are forwarded to the transmit/receive switch 310. The transmit/receive switch 310 connects the antenna to the triplexer 315 for UMTS and GSM Rx operation. When the WTRU 300 is in a GSM Tx mode, the transmit/receive switch 310 connects the antenna to the GSM Tx 345 during GSM transmissions.

The triplexer 315 routes three different signals: a UMTS Rx signal 370, a UMTS Tx signal 375 and a GSM Rx signal 380. The UMTS Tx signal 375 consists of a UMTS transmission generated by UMTS Tx 335 which includes spurious emissions. While the UMTS Tx signal 375 itself may be isolated from the GSM receiver 340 by the triplexer 315 and another possible filter in front of the GSM receiver 340, a portion of the spurious emissions will fall in the GSM receive bandwidth and will result in a leakage 385, consisting of UMTS Tx spurious in-band noise, onto the GSM Rx signal path 380. This leakage 385 must be removed or else the GSM Rx 340 will be desensitized.

An interference cancellation configuration consisting of the bandpass filter 350, I/Q vector multiplier 355, and interference canceler control circuit 360, provides the required attenuation of the leakage 385. The output of the UMTS transmitter 335 is sampled by the first coupler 320 and passes through the bandpass filter 350 to the I/Q vector multiplier 355. The I/Q vector multiplier 355 adjusts the phase and amplitude of the sampled UMTS transmit signal in response to Vi (in-phase voltage) and Vq (quadrature voltage) signals provided by the interference canceler control circuit 360 to minimize the noise seen by the GSM Rx 340. The resulting signal 390 output from the I/Q vector multiplier 355 is combined with the GSM Rx signal 380 via the second coupler 325.

The phase and amplitude of the sampled UMTS signal are adjusted using the Vi line 392 and the Vq line 394 on the I/Q vector multiplier 355 according to the following equations:

$$\text{Amplitude} = 10 \log((Vi^2 + Vq^2)/2Vref^2)) \qquad \text{Equation 1;}$$

and $$\text{Phase} = \arctan(Vq/Vi) \qquad \text{Equation 2.}$$

The interference canceler control circuit 360 receives measurements of the noise measured by the GSM receiver 340 via the modem 365, and adjusts the Vi signal 392 and the Vq signal 394 until the phase and amplitude of the I/Q vector multiplier 355 minimizes the noise. The UMTS Tx leakage 385 may be attenuated by 30 dB, allowing enhanced reception of the GSM Rx signal while transmitting on the UMTS bands.

While this invention has been particularly shown and described with reference to preferred embodiments, it will be understood by those skilled in the art that various changes in form and details may be made therein without departing from the scope of the invention described hereinabove.

What is claimed is:

1. A multi-mode wireless transmit/receive unit (WTRU) comprising:
    a transmit/receive switch electrically coupled to an antenna and a triplexer;
    a first coupler having a first output port electrically coupled to the antenna and the triplexer;
    a second coupler having a first input port electrically coupled to the triplexer;
    a bandpass filter electrically coupled to a second output port of the first coupler;
    a vector multiplier electrically coupled to the bandpass filter and a second input port of the second coupler, the vector multiplier configured to reduce or eliminate interference of signals routed through the second coupler, wherein the vector multiplier adjusts the phase and amplitude of the interference; and an interference canceler control circuit configured to provide in-phase voltage and quadrature voltage to minimize noise.

2. The WTRU of claim 1 further comprising:

an antenna;

the triplexer electrically coupled to the first output port of the first coupler and the first input port of the second coupler;

a first communication mode receiver electrically coupled to the triplexer, the first communication mode receiver configured to receive a first type of signal from the antenna via the transmit/receive switch and the triplexer;

a second communication mode receiver electrically coupled to an output port of the second coupler, the second communication mode receiver configured to receive a second type of signal from the antenna via the transmit/receive switch, the triplexer and the second coupler; and a first communication mode transmitter electrically coupled to an input port of the first coupler, the first communication mode transmitter configured to generate and send the first type of signal to the antenna via the first coupler, the triplexer and the transmit/receive switch, wherein the first and second communication mode receivers simultaneously receive signals from the antenna, and the first transmitter sends the first type of signal to the antenna while, at the same time, the second receiver receives the second type of signal from the antenna.

3. The WTRU of claim 2 wherein the vector multiplier is configured to reduce or eliminate interference of signals received by the second communication mode receiver via the transmit/receive switch, the triplexer and the second coupler, the interference being caused by the first communication mode transmitter.

4. The WTRU of claim 2 further comprising:

a second communication mode transmitter electrically coupled to the transmit/receive switch, the second communication mode transmitter configured to generate and send the second type of signal to the antenna, wherein the transmit/receive switch is configured to selectively connect the second communication mode transmitter to the antenna, prevent signals from the antenna to reach the first and second communication mode receivers, and prevent the first communication mode transmitter from sending the first type of signal to the antenna.

5. The WTRU of claim 2 wherein the first communication mode receiver is a universal mobile telecommunications system (UMTS) receiver.

6. The WTRU of claim 2 wherein the second communication mode receiver is a global system for mobile communications (GSM) receiver.

7. The WTRU of claim 2 wherein the first type of signal is a frequency division duplex (FDD) signal.

8. The WTRU of claim 7 wherein the first type of signal received by the first communication mode receiver is originated by a universal terrestrial radio access (UTRA)-FDD cell.

9. The WTRU of claim 2 wherein the second type of signal is a time division multiple access (TDMA) signal.

10. The WTRU of claim 9 wherein the second type of signal received by the second communication mode receiver is originated by a universal terrestrial radio access (UTRA)-TDD cell.

11. The WTRU of claim 9 wherein the second type of signal received by the second communication mode receiver is originated by a global system for mobile communications (GSM) cell.

* * * * *